US012749844B2

(12) United States Patent
Azuma et al.

(10) Patent No.: US 12,749,844 B2
(45) Date of Patent: Sep. 29, 2026

(54) CONNECTOR

(71) Applicant: Yazaki Corporation, Tokyo (JP)

(72) Inventors: Shinsuke Azuma, Shizuoka (JP); Hiroki Gotou, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 388 days.

(21) Appl. No.: 18/491,095

(22) Filed: Oct. 20, 2023

(65) Prior Publication Data

US 2024/0136758 A1 Apr. 25, 2024
US 2024/0235099 A9 Jul. 11, 2024

(30) Foreign Application Priority Data

Oct. 24, 2022 (JP) ................................ 2022-169675

(51) Int. Cl.

| | |
|---|---|
| ***H01R 13/50*** | (2006.01) |
| ***H01R 13/424*** | (2006.01) |
| ***H01R 13/506*** | (2006.01) |
| ***H01R 13/516*** | (2006.01) |

(52) U.S. Cl.

CPC ......... *H01R 13/506* (2013.01); *H01R 13/424* (2013.01); *H01R 13/516* (2013.01)

(58) Field of Classification Search

CPC .. H01R 13/506; H01R 13/424; H01R 13/516; H01R 13/4223; H01R 13/4367; H01R 13/5202; H01R 13/502; H01R 43/20; H01R 13/40

See application file for complete search history.

(56) References Cited

U.S. PATENT DOCUMENTS

| | | | | |
|---|---|---|---|---|
| 5,655,921 A * | 8/1997 | Makal | H01R 13/53 | 439/206 |
| 6,361,348 B1 * | 3/2002 | Hall | H01R 24/40 | 439/352 |
| 11,695,242 B2 * | 7/2023 | Kim | H01R 13/502 | 439/676 |
| 2007/0197069 A1 * | 8/2007 | Iwahori | H01R 13/5219 | 439/157 |
| 2009/0017678 A1 * | 1/2009 | Meier | H01R 9/0518 | 439/582 |
| 2011/0045699 A1 * | 2/2011 | Youn | H01R 13/6583 | 439/607.19 |
| 2012/0264331 A1 * | 10/2012 | Jimbo | H01R 13/6592 | 439/607.01 |
| 2014/0051276 A1 * | 2/2014 | Itou | H01R 13/5208 | 439/271 |

(Continued)

FOREIGN PATENT DOCUMENTS

| | | | |
|---|---|---|---|
| CN | 112909610 A | 6/2021 | |
| EP | 1700829 * | 4/2007 | H01R 13/52 |

(Continued)

*Primary Examiner* — Truc T Nguyen
(74) *Attorney, Agent, or Firm* — Sughrue Mion, PLLC

(57) ABSTRACT

A connector includes a housing, a terminal configured to be assembled to the housing, and a cover configured to be assembled to the housing. The terminal has a first connection part configured to be electrically connected to a first mating terminal, and a second connection part configured to be electrically connected to a second mating terminal. The housing, the terminal, and the cover are formed to be assembled along a first axis.

2 Claims, 4 Drawing Sheets

(56) References Cited

U.S. PATENT DOCUMENTS

| | | | | |
|---|---|---|---|---|
| 2014/0060924 | A1* | 3/2014 | Yamashita | H01R 13/187<br>174/72 A |
| 2014/0295684 | A1* | 10/2014 | Gette | H01R 13/639<br>439/137 |
| 2015/0229067 | A1* | 8/2015 | Nakai | H01R 13/405<br>439/587 |
| 2018/0183177 | A1* | 6/2018 | Yamanaka | H01R 13/521 |
| 2020/0295505 | A1* | 9/2020 | Iida | H01R 13/42 |
| 2020/0313335 | A1* | 10/2020 | Kondo | H01R 13/426 |
| 2020/0395703 | A1 | 12/2020 | Shimizu | |
| 2021/0175646 | A1 | 6/2021 | Choi et al. | |
| 2022/0102894 | A1 | 3/2022 | Shimizu | |
| 2022/0131309 | A1 | 4/2022 | Oomori et al. | |
| 2023/0091937 | A1* | 3/2023 | Watanabe | H01R 13/502<br>439/135 |
| 2023/0253720 | A1* | 8/2023 | Jin | H01R 24/64<br>439/404 |

FOREIGN PATENT DOCUMENTS

| | | | |
|---|---|---|---|
| JP | H4-81469 | U | 7/1992 |
| JP | 2017-103160 | A | 6/2017 |
| JP | 2018-107035 | A | 7/2018 |
| JP | 2021-097055 | A | 6/2021 |
| JP | 2022-68907 | A | 5/2022 |
| WO | 2010/026449 | A1 | 3/2010 |

* cited by examiner

CONNECTOR

CROSS REFERENCE TO RELATED APPLICATION

The present application is based on, and claims priority from the prior Japanese Patent Application No. 2022-169675, filed on Oct. 24, 2022, the entire contents of which are incorporated herein by reference.

TECHNICAL FIELD

The present disclosure relates to a connector.

RELATED ARTS

Conventionally, a connector having a housing, a spring part as a terminal to be attached to the housing, and a holding cap as a cover to be attached to the housing is known (see JP 2021-97055 A). In this connector, a mating terminal as a first mating terminal and a connection terminal as a second mating terminal are inserted into the spring part. The mating terminal and the connection terminal inserted into the spring part are electrically connected by the spring part by being held therein.

SUMMARY

In the connector as described in JP 2021-97055 A, the first mating terminal and the second mating terminal are inserted into one connection part of the terminal, and the first mating terminal and the second mating terminal are electrically connected. In such a structure in which two mating terminals are electrically connected within one connection part, portions to be in contact with each other exist only within the one connection part. Therefore, in order to ensure an electrical connection reliability, it is necessary to hold the terminals to the housing with high precision and insert the mating terminals to the connection part with high precision, thereby complicating the structure and increasing the manufacturing cost.

Further, in the connector described in JP 2021-97055 A, the housing and the terminals are assembled along a first axis and the housing and the cover are assembled along a second axis, which is orthogonal to the first axis. Therefore, the housing, the terminal, and the cover are assembled along two intersecting axis lines. When the assembly is carried out along a plurality of axis lines, an assembling work becomes complicated or the automation of the assembling work becomes difficult, and the assembling cost becomes high.

An object of the present disclosure is to provide a connector that can be made at a lower cost.

The connector according to one or more embodiments includes a housing, a terminal configured to be assembled to the housing, and a cover configured to be assembled to the housing. The terminal has a first connection part configured to be electrically connected to a first mating terminal, and a second connection part configured to be electrically connected to a second mating terminal. The housing, the terminal, and the cover are formed to be assembled along a first axis.

According to the above configuration, a connector that can be made at a lower cost can be provided.

DETAILED DESCRIPTION

Various embodiments will be described hereinafter with reference to the accompanying drawings.

Figure 1:
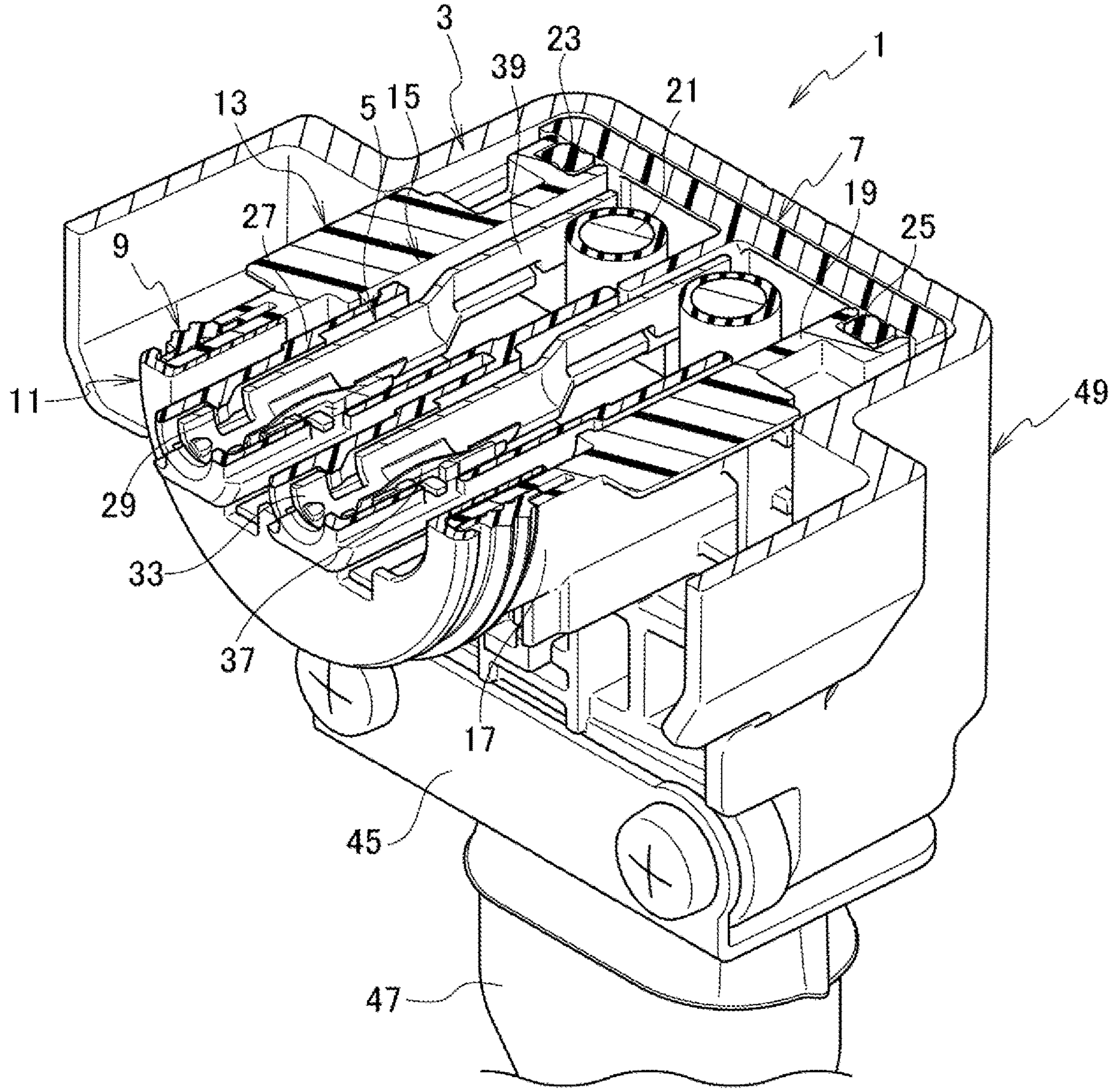
FIG. 1 is a perspective view of a connector according to the present embodiment with a part in cross section.
Figure 2:
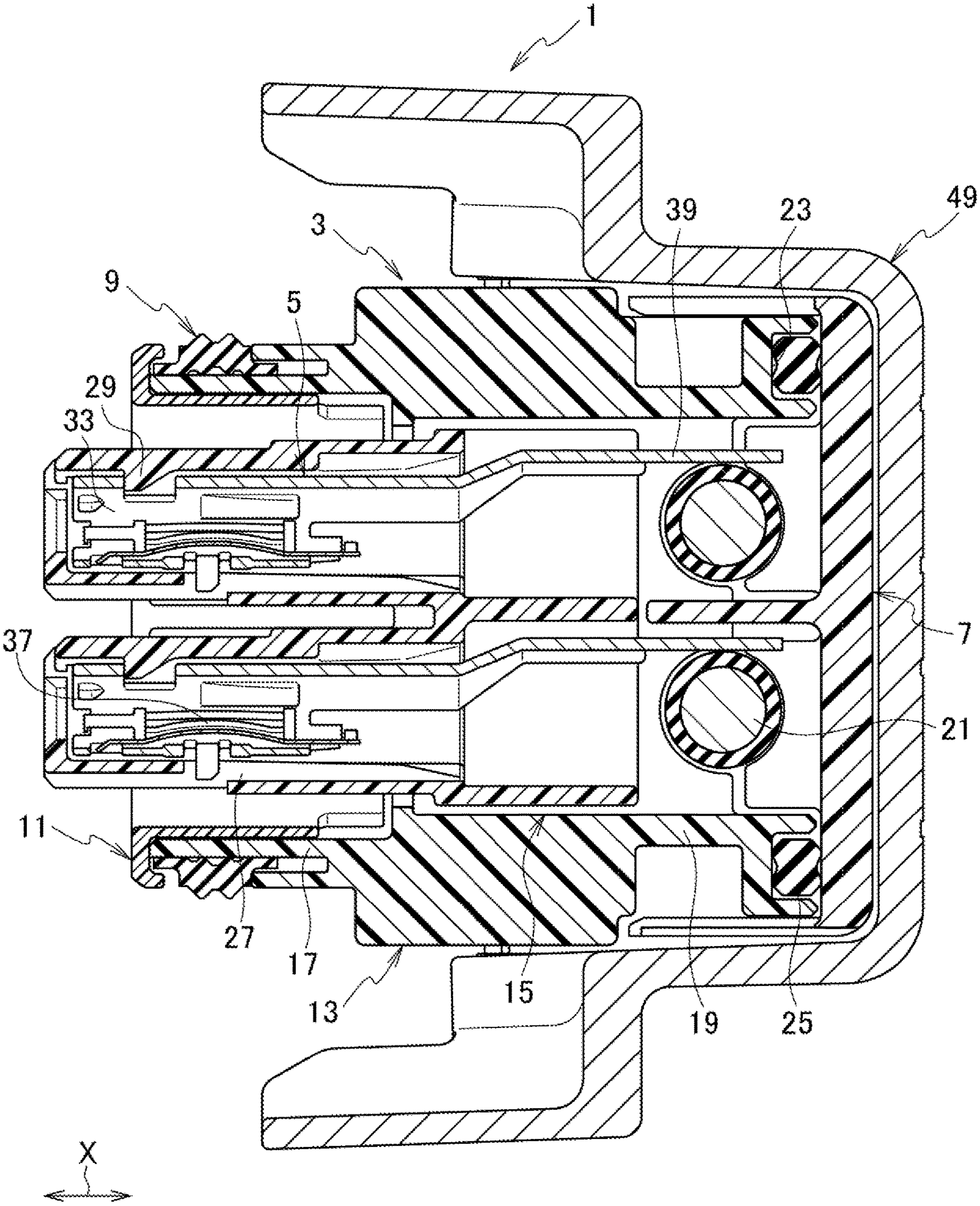
FIG. 2 is a cross-sectional view of the cross section illustrated in FIG. 1.
Figure 3:
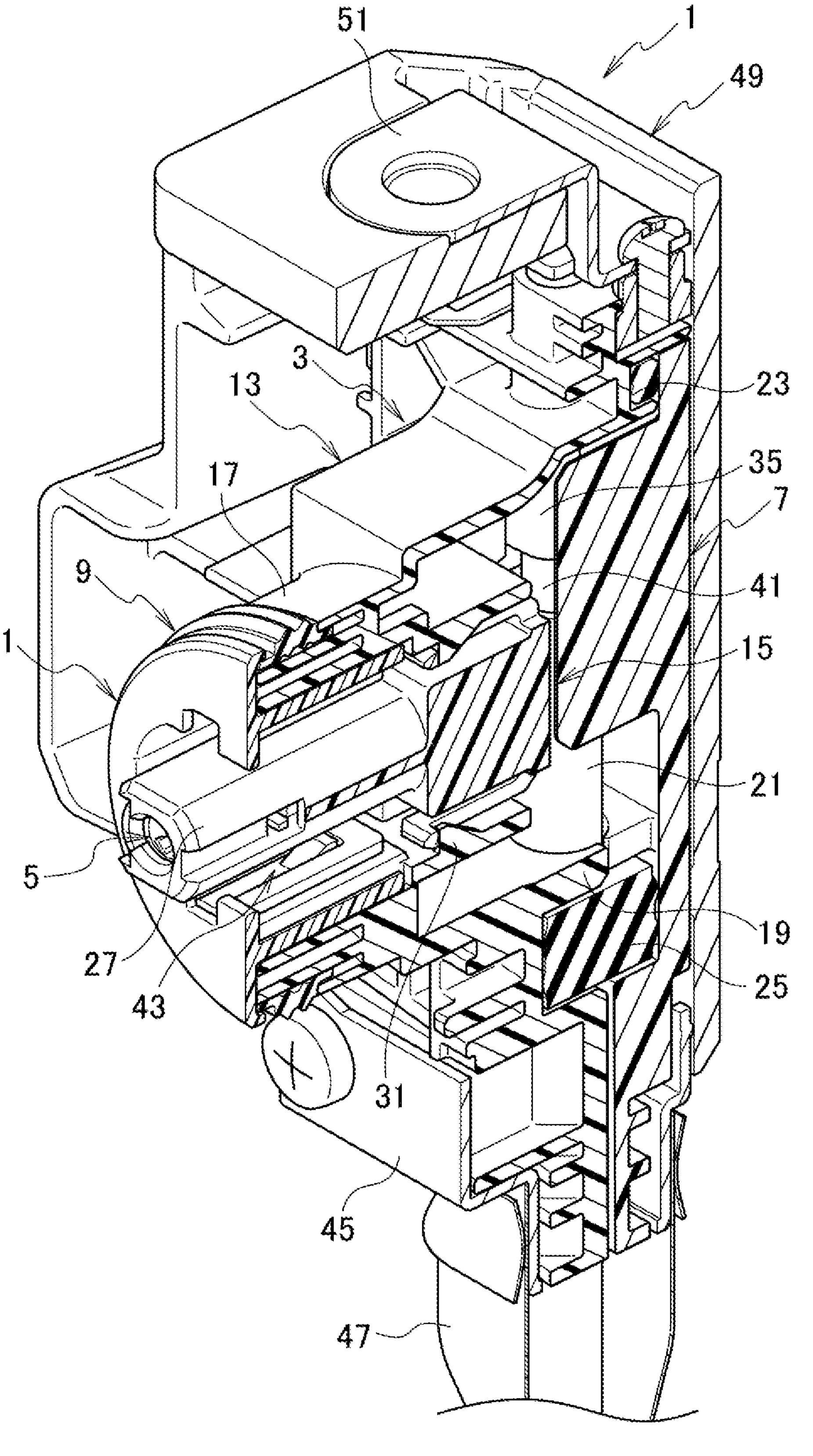
FIG. 3 is a perspective view of the connector according to the present embodiment with a part in cross section.
Figure 4:
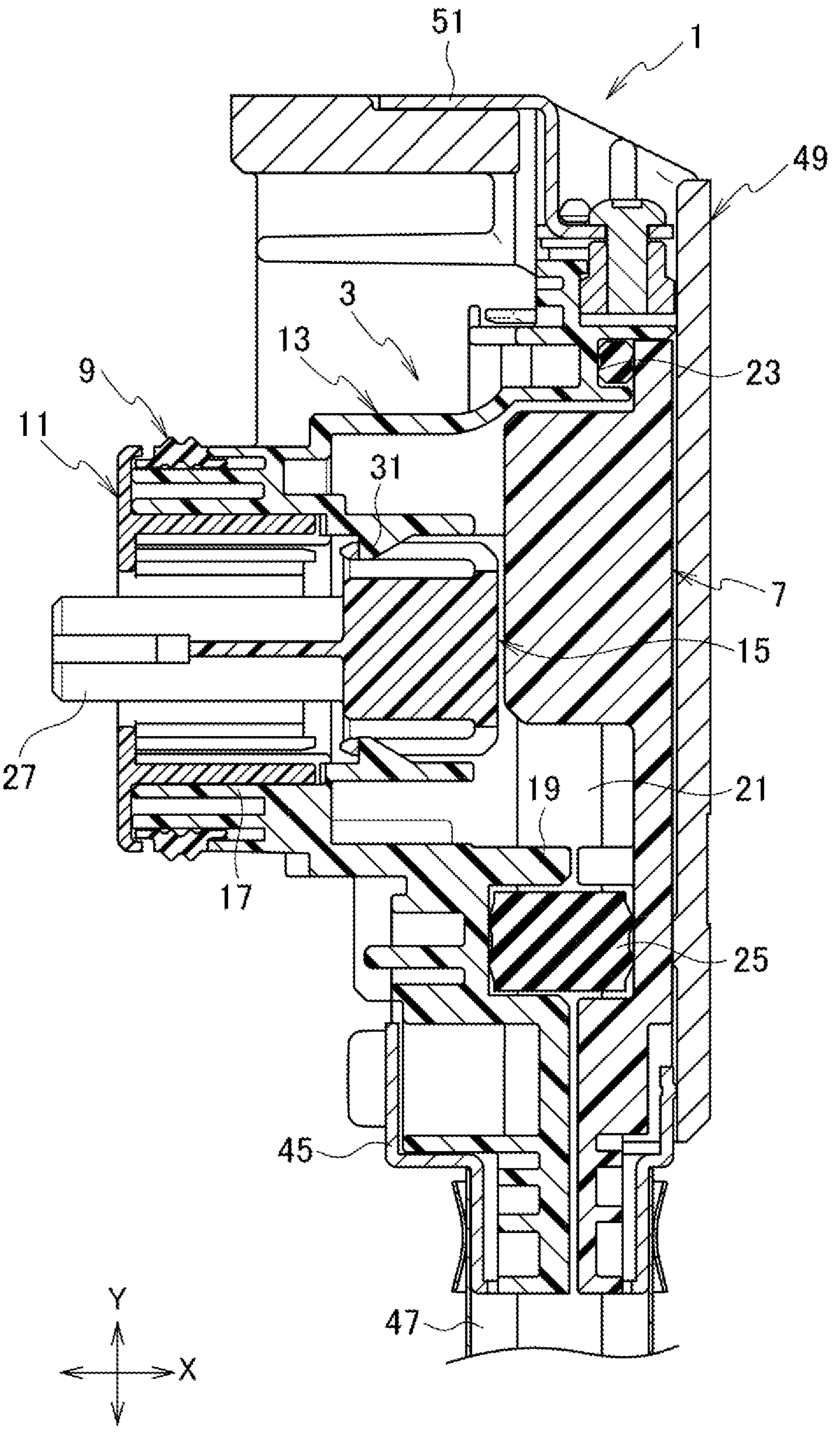
FIG. 4 is a cross-sectional view of the cross section illustrated in FIG. 3.

As illustrated in FIGS. 1 to 4, a connector 1 according to one or more embodiments is arranged between a power supply (not illustrated) and a device (not illustrated), for example. The connector 1 is electrically connected to the power supply, for example. A mating connector (not illustrated) electrically connected to the device is fitted to the connector 1, and the power supply and the device are electrically connected through the connector 1 and the mating connector. FIG. 2 is a cross section of the connector 1 perpendicular to the second axis Y including a terminal 5 to be described later. FIG. 4 is a cross section of the connector 1 parallel to a plane including a first axis X and a second axis Y to be described later.

As illustrated in FIGS. 1 to 3, the connector 1 includes a housing 3, the terminal 5, a cover 7, a packing 9, and a holder 11.

The housing 3 may include an outer housing 13 and an inner housing 15 as in the present embodiment.

The outer housing 13 is made of an insulating material such as a synthetic resin, for example. As illustrated in FIGS. 3 and 4, the outer housing 13 includes a fitting portion 17 extended along the first axis X and an accommodation portion 19 extended along the second axis Y orthogonal to the first axis X. The fitting portion 17 has a cylindrical shape and extends along the first axis X so as to accommodate the inner housing 15 inside the fitting portion 17. The fitting portion 17 is configured to fit into a mating connector (not illustrated) electrically connected to the device along the first axis X. The accommodation portion 19 is formed of one piece with the fitting portion 17 and is continuous with each other. One side of the accommodation portion 19 in the first axis X direction communicates with the fitting portion 17, and an opening is formed on the other side of the accommodation portion 19 opposite to the fitting portion 17. The accommodation portion 19 has a cylindrical shape and extends along the second axis Y. A second connection part 35 of the terminal 5 is arranged on one side of the accommodation portion 19 in the second axis Y direction. An electric wire 21 electrically connected to a power source is disposed on the other side of the accommodation portion 19 in the second axis Y direction. As illustrated in FIG. 2, at the part of the accommodation portion 19 where the electric wire 21 is disposed, a recess having a semicircular cross section perpendicular to the second axis Y direction and extending in the second axis Y direction is formed on a surface of the part of the accommodation portion 19 to be adjacent to the outer periphery of electric wire 21. A groove 23 is continuously formed around the opening formed at the other end of the accommodation portion 19 in the first axis X direction. A seal member with an annular shape is attached to the groove 23 so to have close contact in the first axis X. In a part of the seal member 25 where the electric wire 21 is arranged, a wall thickness of the seal member 25 along the second axis Y is set to be thick and a through hole is formed on the wall of the seal member 25 so as to insert the electric wire 21 and have close contact with the electric wire 21, thereby sealing the inside of the accommodation portion 19.

The inner housing 15 is made of an insulating material such as a synthetic resin, for example. The inner housing 15 has a cylindrical shape and extends along the first axis X. The interior of the inner housing 15 is partitioned into a plurality of (two in the present embodiment) accommodation spaces to accommodate a plurality of (two in the present embodiment) terminals 5. Specifically, a plurality of (two in the present embodiment) terminal accommodation chambers 27 are formed in the inner housing 15 on the fitting portion 17 side, each terminal accommodation chamber configured to accommodate a first connection part 33 of the terminal 5. Each terminal accommodation chamber 27 has a cylindrical shape and extends along the first axis X. As illustrated in FIGS. 1 and 2, each of the terminal accommodation chambers 27 is provided with a terminal locking part 29 which is configured to engaged with the first connection part 33 of the terminal 5 in an elastically deformable manner. The terminal locking part 29 engages with the first connection part 33 of the terminal 5 to hold the terminal 5 in the housing 3.

The inner housing 15 may be formed to be assembled to the outer housing 13 along the first axis X. Specifically, the inner housing 15 may be assembled to the outer housing 13 by being inserted into the fitting portion 17 of the outer housing 13. In this embodiment, the fitting portion 17 of the outer housing 13 is provided with a housing locking part 31 configured to engage with the inner housing 15 in an elastically deformable manner. The housing locking part 31 is formed so as to be engageable with a part to be engaged, which is a hole formed in the inner housing 15. A pair of housing locking parts 31 are provided in a position opposite in the radial direction on the fitting portion 17 in a circumferential direction. In other words, as illustrated in FIGS. 3 and 4, a pair of housing locking parts 31 are provided on the inner circumferential surface of the fitting portion 17 and face each other in the direction of the second axis Y. Each housing locking part 31 engages with a part to be engaged of the inner housing 15 to maintain an assembled state of the outer housing 13 and the inner housing 15. The housing locking part 31 has a different circumferential arrangement position relative to the terminal locking part 29. Specifically, as illustrated in FIG. 4, the housing locking parts 31 are arranged in the fitting portion 17 so as to face each other in the second axial direction Y. In contrast, as illustrated in FIG. 2, the terminal locking part 29 is formed on an inner wall surface in the direction perpendicular to the first axial direction X and the second axial direction Y of the terminal accommodation chamber 27. Therefore, the radial clearance between the housing locking part 31 and the terminal locking part 29 does not overlap in the radial direction. As a result, the entire connector 1 can be restrained from rattling in the radial direction.

Each terminal 5 is made of a conductive material and a plurality of (two in the present embodiment) the terminals 5 are configured to be accommodated in the housing 3. Each terminal 5 includes the first connection part 33 and the second connection part 35.

The first connection part 33 has in a cylindrical shape and extends along the first axial line X. A first contact part 37 which can be elastically deformed is provided inside the first connection part 33. The first connection part 33 is arranged in the terminal accommodation chamber 27 of the inner housing 15 when the terminal 5 is accommodated in the housing 3 along the first axial line X. At this time, the terminal locking part 29 is engaged with the first connection part 33 of the terminal 5, and the terminal 5 is held in the housing 3. When the mating connector is fitted to the fitting portion 17 along the first axis X, the tab-shaped first mating terminal (not illustrated) of the mating connector is inserted into the first connection part 33. The first mating terminal inserted into the first connection part 33 contacts the first contact part 37 and is electrically connected to the terminal 5.

The second connection part 35 is formed of a piece of material that is continuous with the first connection part 33 through the connection part 39. The second connection part has a cylindrical shape and extends along the second axis Y. A second contact part (not illustrated) which can be elastically deformed is provided inside the second connection part 35 in the same manner as the first connection part 33. The second connection part 35 is arranged in the accommodation portion 19 of the outer housing 13 when the terminal 5 is accommodated in the housing 3. When a tab-shaped second mating terminal 41 electrically connected to the electric wire 21 along the second axis line Y is inserted into the housing 3, the second mating terminal 41 is inserted into the second connection part 35. The second mating terminal 41 inserted into the second connection part 35 contacts the second contact part and is electrically connected to the terminal 5.

The first mating terminal and the second mating terminal 41 are electrically connected to each other through the terminal 5, and the power supply and the device are electrically connected. The first mating terminal and the second mating terminal 41 are electrically connected to the first connection part 33 and the second connection part 35 provided as independent parts of the terminal 5, respectively. Therefore, it is not necessary to electrically connect the first mating terminal and the second mating terminal 41 by one connecting part. Furthermore, when inserting the first mating terminal and the second mating terminal 41 into the first connection part 33 and the second connection part 35, high-precision operation is not required. In addition, it is not necessary to hold the terminal 5 to the housing 3 with high precision.

The cover 7 is made of an insulating material such as a synthetic resin, for example. The cover 7 is formed in a shape that can close the opening of the accommodation portion 19 of the outer housing 13 while being assembled to the outer housing 13. On a second connection part 35 side of the cover 7, a partition wall configured to divide the second connection part 35 and the electric wire 21 is provided. On the part of the cover 7 that is adjacent to the electric wire 21 being arranged on the accommodation portion 19 in the state of being assembled to the outer housing 13, a recess having a semicircular cross section perpendicular to the second axis Y direction and extending in the second axis Y direction is formed on the surface of the electric wire 21 side. With this configuration, the electric wire 21 and the seal member 25 configured to insert the electric wire 21 are arranged in the connector 1 so as to be sandwiched between the accommodation portion 19 of the outer housing 13 and the cover 7. The cover 7 is attached to the outer housing 13 along the first axis X so as to close the opening of the accommodation portion 19. A cover locking part (not illustrated) for holding the assembled state of the outer housing 13 and the cover 7 is provided between the outer housing 13 and the cover 7. When the cover 7 is assembled to the outer housing 13, the cover 7 comes into close contact with the sealing member 25, and the space between the housing 3 and the cover 7 is sealed.

The packing 9 is made of an elastic material such as rubber. The packing 9 is formed in an annular shape which can be attached on an outer periphery of the fitting portion

17 in the outer housing 13 and configured to be in close contact with the outer periphery. The packing 9 may be formed to be assembled along the first axis X with respect to the fitting portion 17 of the outer housing 13. The packing 9 closely contacts to the inner surface of the mating connector while the mating connector is fitted to the fitting portion 17, and seals a space between the housing 3 and the mating connector.

The holder 11 is made of an insulating material such as synthetic resin, for example. The holder 11 has a cylindrical shape and extends along the first axis X so as to be insertable into the fitting portion 17 of the outer housing 13, and a flange larger in diameter than the fitting portion 17 is formed at a portion on the rear end side in the insertion direction of the holder 11. The holder 11 may be attached to the fitting portion 17 of the outer housing 13 along the first axis X while the cylindrical part of the holder 11 is inserted into the fitting portion 17. A holder locking part 43 is provided between the outer housing 13 and the holder 11 to hold the assembled state of the outer housing 13 and the holder 11. Specifically, the holder locking part 43 protrudes from the inner surface of the fitting portion 17 to hold the holder 11. When the holder 11 is assembled to the outer housing 13, the flange comes into close contact with the packing 9 and prevents the packing 9 from falling off from the housing 3.

A shield member 45 made of a conductive material is fixed to the housing 3 through a bolt. An electric wire shield 47 made of a conductive material covering the outer periphery of the electric wire 21 is electrically connected to the shield member 45 through a clamping member. The shield member 45 makes contact with the mating shield member (not illustrated) of the mating connector while the mating connector is fitted to the fitting portion 17 to form a shield circuit. In addition, the housing 3 is housed inside the mating member 49 configured to fit the mating connector inside. The housing 3 is fixed to the mating member 49 by fastening a bolt and a nut to the fixing member 51. By housing the housing 3 in the mating member 49, the housing 3 can be protected and stably maintain a fitted state of the housing 3 and the mating connector.

In assembling the connector 1, the terminal 5 is assembled along the first axis X with respect to the inner housing 15. The inner housing 15 is assembled along the first axis X with respect to the outer housing 13. Then, the cover 7 is assembled along the first axis X with respect to the outer housing 13. The packing 9 is assembled along the first axis X to the outer housing 13. The holder 11 is assembled along the first axis X to the outer housing 13. By the above process, the assembly of the connector 1 is completed. The packing 9 and the holder 11 may be previously assembled to the outer housing 13.

In this way, all members included in the connector 1 is assembled along the first axis X. Therefore, in the assembling work, all members can be assembled in a fixed direction without changing the orientation of the members, and the assembling work can be simplified. In addition, since the orientation of the members is not changed during the assembling work, an automation of the assembling work can be facilitated.

The connector 1 includes the housing 3, the terminal 5 configured to be assembled to the housing 3, and the cover 7 configured to be assembled to the housing 3. The terminal has the first connection part 33 configured to be electrically connected to the first mating terminal and a second connection part 35 configured to be electrically connected to the second mating terminal 41. The housing 3, the terminal 5, and the cover 7 are formed to be assembled along the first axis X.

The terminal 5 has the first connection part 33 configured to be electrically connected to the first mating terminal and a second connection part 35 configured to be electrically connected to the second mating terminal 41. Therefore, the first mating terminal and the second mating terminal 41 are electrically connected to the first connection part 33 and the second connection part 35, respectively, which the parts are provided to the terminal independently. Therefore, it is not necessary to electrically connect the first mating terminal and the second mating terminal 41 inside a one connection part. Furthermore, when inserting the first mating terminal and the second mating terminal 41 into the first connection part 33 and the second connection part 35, high-precision operation is not required. In addition, it is not necessary to hold the terminal 5 to the housing 3 with high precision. Therefore, the structure of the connector can be simplified, and the manufacturing cost can be reduced.

Further, the housing 3, the terminal 5, and the cover 7 are formed to be assembled along the first axis X. Therefore, in the assembling work, all members can be assembled in a fixed direction without changing the orientation of the members, and the assembling work can be simplified. In addition, since the orientation of the members is not changed in the assembling work, the automation of the assembling work can be facilitated. Therefore, the assembling cost can be reduced.

Therefore, in the connector 1, the manufacturing cost and the assembling cost can be reduced, and the overall cost to produce the connector 1 can be reduced.

In the housing 3, the packing 9 and the holder 11 may be formed to be assembled along the first axis X. With this configuration, even if the packing 9 and the holder 11 are added, the assembling work can be performed without changing the orientation of the packing 9 and the holder 11, thereby reducing the cost.

Further, the housing 3 has an outer housing 13 and an inner housing 15 assembled to the outer housing 13. The outer housing 13 and the inner housing 15 may have a configuration to be assembled along the first axis X. The inner housing 15 may have a terminal 5 to be assembled along the first axis X and a terminal locking part 29 for holding the terminal 5.

With this configuration, even when the housing 3 has the outer housing 13 and the inner housing 15, it is not necessary to change the orientation of the outer housing 13 and the inner housing 15 in the assembling operation, and the cost can be reduced. In addition, in the assembling of the inner housing 15 and the terminal 5, it is not necessary to change the orientation of the inner housing 15 and the terminal 5, and the cost can be reduced. Since the terminal 5 is stably held in the inner housing 15 by the terminal locking part 29, the electrical connection reliability of the terminal 5 can be improved.

The housing locking part 31 for holding the inner housing 15 in the outer housing 13 may be provided between the outer housing 13 and the inner housing 15. The housing locking part 31 may have a different position in the circumferential direction of the first axis X with respect to the terminal locking part 29.

With this configuration, the radial clearance between the housing locking part 31 and the terminal locking part 29 does not overlap in the radial direction, and the radial clumping of the entire connector 1 can be suppressed. Therefore, the clumping of the terminal 5 attached to the inner housing 15 can be suppressed, and the electrical connection reliability of the terminal 5 can be maintained.

Although one or more embodiments have been described above, the embodiments are not limited to these, and various variations are possible within the scope of the outline of the embodiments.

For example, in the terminal 5 of the present embodiment, the first connection part 33 is electrically connected to the first mating terminal along the first axis X, and the second connection part 35 is electrically connected to the second mating terminal 41 along the second axis Y, but a configuration for the first connection part and the second connection part is not limited to the above. For example, the connection between the first connection part and the first mating terminal and the connection between the second connection part and the second mating terminal may be made along the first axis, so that any electrical connection can be made as long as the first connection part and the second connection part are provided to the terminal independently.

In the one or more embodiments, the first connection part 33 and the second connection part 35 are of a female shape formed in a cylindrical shape, but a configuration for the first connection part and the second connection part is not limited to the above. The first connection part and the second connection part may have any form as long as they can be electrically connected to the first mating terminal and the second mating terminal, such as being formed in a tab-shaped male shape.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector comprising:

a housing;

a terminal configured to be assembled to the housing, and a cover configured to be assembled to the housing, wherein the terminal comprises a first connection part configured to be electrically connected to a first mating terminal upon insertion of the first mating terminal into the first connection part, and a second connection part configured to be electrically connected to a second mating terminal upon insertion of the second mating terminal into the second connection part, the housing, the terminal, and the cover are formed to be assembled along a first axis, the second connection part extends along a second axis orthogonal to the first axis, the housing comprises an outer housing and an inner housing configured to be assembled to the outer housing, the outer housing and the inner housing are formed to be assembled along the first axis, and the terminal is formed to be assembled to the inner housing along the first axis and the inner housing comprises a terminal locking part configured to hold the terminal in the inner housing, between the outer housing and the inner housing, a housing locking part configured to hold the inner housing in the outer housing is provided, and a circumferential arrangement position of the housing locking part with respect to the first axis is different from a circumferential arrangement position of the terminal locking part with respect to the first axis.

2. The connector according to claim 1, the connector further comprises a packing and a holder each formed to be assembled to the housing along the first axis.

* * * * *